United States Patent [19]

Vazin

[11] Patent Number: 4,909,526
[45] Date of Patent: Mar. 20, 1990

[54] THIGH-ASSISTED PEDAL POWERED STRUCTURES

[76] Inventor: Hassan Vazin, P.O. Box 218025, Nashville, Tenn. 37221-8025

[21] Appl. No.: 297,928
[22] Filed: Jan. 17, 1989
[51] Int. Cl.⁴ ............................................. B62M 1/02
[52] U.S. Cl. ...................................... 280/230; 272/73
[58] Field of Search ............... 280/230, 251, 253, 255; 272/69, 73

[56] References Cited

FOREIGN PATENT DOCUMENTS

| | | | |
|---|---|---|---|
| 398350 | 9/1933 | Belgium | 280/230 |
| 81199 | 5/1895 | Fed. Rep. of Germany | 280/230 |
| 896837 | 5/1944 | France | 280/230 |

*Primary Examiner*—Mitchell J. Hill

[57] ABSTRACT

There is disclosed a pedal powered structure in which a frame carrying a seat and an axle with a pivotally mounted pedal on each side thereof is modified to include a pedal axle extension beyond the pedal at its inner and outer ends to provide inner and outer extensions, said pedal axle rotating on a bearing mounted within a crank assembly. Ligatures, one for each pedal axle extension, are connected at one end to one of the pedal axle extensions, at the other end to an element mounted behind and below the seat. The parallel ligatures spaced apart by approximately the width of the pedal, and straps are secured between each pair of parallel ligatures intermediate its length to rest upon the thigh of the rider above the knee when the rider is using the pedal powered structure.

7 Claims, 4 Drawing Sheets

THIGH-ASSISTED PEDAL POWERED STRUCTURES

TECHNICAL FIELD

This invention relates to thigh-assisted pedal-powered structures, especially bicycles, in order to utilize the upward thrust of the thigh to more effectively utilize the strength of the leg in powering the pedal structure.

BACKGROUND ART

In conventional pedal-powered structures, a pair of pedals are joined to a common axle by cranks, and each leg of the operator powers one of the pedals for rotary movement around the axle. In many instances there is no connection of the foot to the pedal. As a result, each leg powers the axle for only half its rotation. Of course, as one foot bears down on one pedal, it forces the other pedal up which raises the other pedal with its associated foot, thus placing that foot in a position to power the other half of the rotary motion. This limitation of pedal power to each foot separately for half the rotation will be particularly apparent to anyone who tries to operate a bicycle with only one leg.

For an operator, this limitation of pedal power to each leg separately for half the rotation wastes the power which might be provided by the operator as he raises his leg to prepare for the next downstroke of the pedal.

In many instances, the operator will use straps to couple his foot to the pedal so that the pedal will be pulled upwardly as he raises his leg. To a small degree, this helps to increase the power of the operator, but as the pedal is at the extremity of the leg, the raising of the leg by the operator on the upward stroke is not most effectively utilized for the production of additional power.

In this invention it is desired to more effectively utilize the power potential provided by the operator of a pedal powered structure as he uses his thigh muscles to raise the pedal in preparation for the ensuing downstroke. It has been found that when the thigh is effectively utilized, a rider can accelerate more rapidly or climb a hill more easily. While an effective coupling between the thigh and the pedaling structure tends to make riding a conventional bicycle more complicated, preferred constructions in accordance with this invention minimize this difficulty. Of course, in some utilities, as in exercise machines, the fact that the user or "rider" is coupled to the machine is of little consequence.

DESCRIPTION OF INVENTION

In accordance with this invention, a pedal powered structure is provided in which a frame carries a stationary seat and an axle with a pedal crank connected to the axle on each side thereof. Each pedal, as is conventional, is rotationally mounted to a pedal axle which, in this invention, is extended on both sides of each pedal for rotational connection to a ligature. These ligatures form two pairs of parallel ligatures which enable the pedal powered structure to be coupled to the thigh of the rider to enhance the rider's capacity to power the structure.

More particularly, this invention provides, in a pedal powered structure, a frame carrying a seat and a main axle positioned forwardly of and below the seat. A pair of cranks is connected to the axle, one crank on each side thereof, and a pedal is mounted by means of a pedal axle at the free end of each crank. This pedal is rotationally mounted on the pedal axle with the pedal axle extending beyond the pedal at its inner and outer ends to provide inner and outer pedal axle extensions. The pedal axle is attached directly to the crank, and rotates on a bearing mounted in the crank assembly. Ligatures are provided, one for each axle extension, with each ligature being connected at one end to one of the pedal axle extensions and the other end of each ligature being connected to an element mounted behind and below the seat. These ligatures, mounted as set forth, provide two pairs of parallel ligatures (one on each side of the main axle) with the ligatures or each pair being spaced apart by approximately the width of the pedal. Strap means are secured between each pair of parallel ligatures intermediate its length to rest upon the thigh of the rider above the knee when the rider is using the pedal powered structure.

In preferred practice, each ligature is connected to the strap by means of a pulley, one pulley being present at each end of each strap. Two links may be employed, one being connected to the end of the strap and a second interconnecting the first link and a pulley. This pulley arrangement allows the strap to remain fixed on the thigh above the knee as the ligatures move longitudinally with respect to the strap as the rider powers the pedals. It is also desired to have a downwardly extending flap carried at each end of the strap to help keep hair and skin from being caught in the pulley.

Also, it is preferred that each strap be formed in two sections which are releasably interconnected with each other. As will be evident, this allows the strap to be conveniently released from each leg, ensuring that the operator can quickly release himself from the mechanism in case of emergency.

Moreover, and as will be clear, this invention primarily contemplates wheeled vehicles, especially bicycles, and in order to ensure that the rider's leg reaches the ground during stops, the length of the ligatures must be increased. This is achieved herein by securing the ligatures at their end remote from the pedals to a fixed structure which can be released to move forwardly when triggered to do so, and it is especially desired to have this triggering take place automatically when the brakes are applied.

As will be understood, the invention is applicable to various pedal-powered structures. These are frequently associated with some form of a vehicle, such as a bicycle, tricycle or pedal-powered aircraft. However, one feature of the invention is the fact that more muscles are utilized in providing power in the invention, so that this invention is importantly applicable to exercise machines.

The invention will be more fully understood from the accompanying drawing in which.

Figure 1:
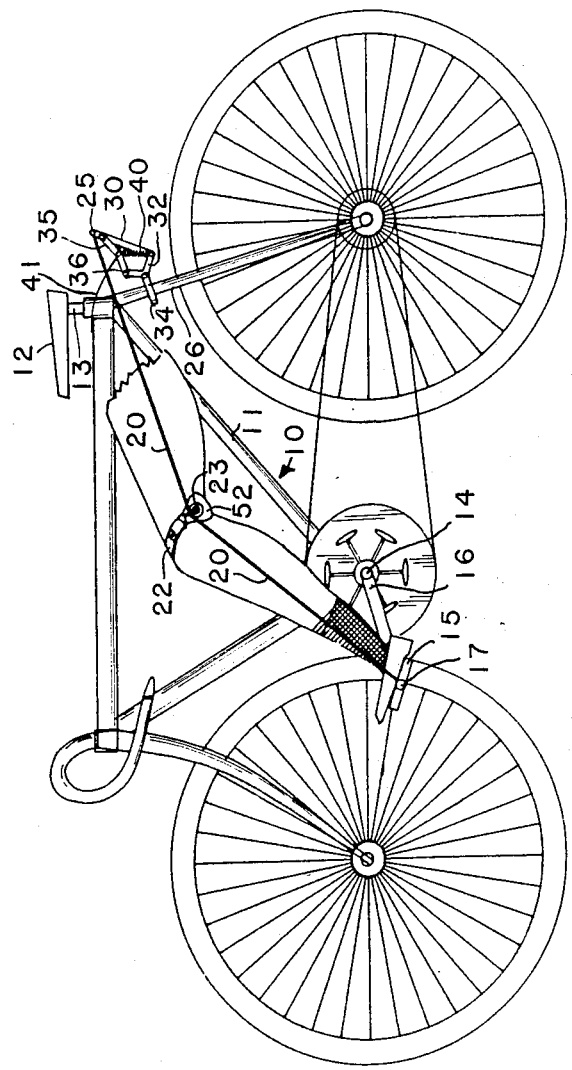
FIG. 1 is a partial pictorial view showing a portion of a bicycle modified in accordance with this invention and having a rider thereon.

Referring more particularly to FIG. 1, the invention is shown associated with a conventional bicycle, in which 10 identifies a bicycle frame in which 11 is the main frame element on which a seat 12 is carried via a seat stem 13. The main axle 14 is carried at the lower end of the main frame 11. A pedal 15 is mounted at the free end of crank 16 which is connected at its other end to the main axle 14.

It will be appreciated that in FIG. 1, only the elements on the near side of the bicycle are shown, it being understood that the elements on the far side of the bicycle are the same as those on the near side which is pictured.

Figure 3:
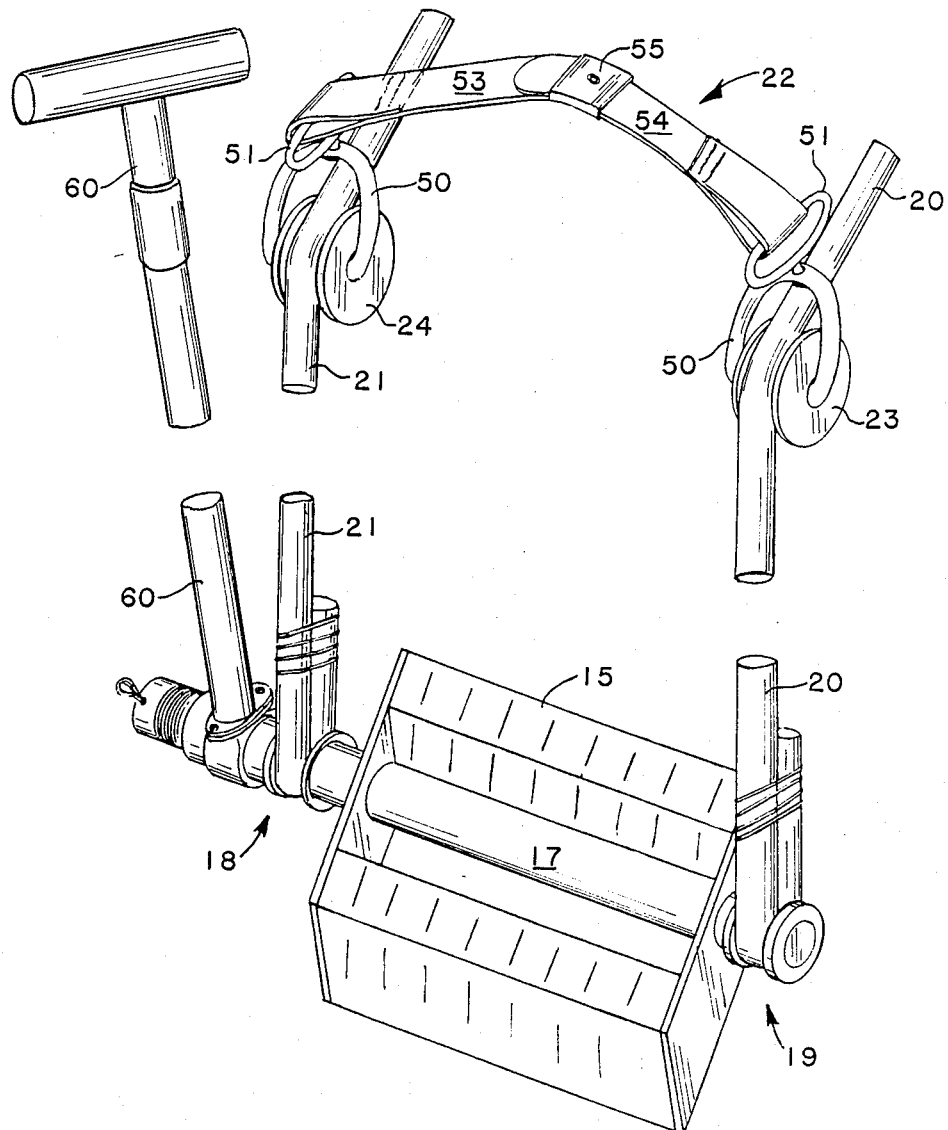
FIG. 3 is a pictorial view showing a pedal, the ligatures connected thereto and the strap mounting which connects the ligatures with the ends of the strap which is used by resting the same on the thigh above the knee.

The pedal 15 is rotatable about pedal axle 17, as is conventional, and the pedal axle 17 is longer than conventional, as shown in FIG. 3 where it provides inward and outwardly projecting axle extensions 18 and 19. As will be discussed hereinafter, the ligatures which connect the rider's thigh to the pedal powering system are rotatably mounted with respect to the axle extensions 18 and 19. The outer ligature on the near side of the bicycle can be seen in FIG. 1 where it is identified by numeral 20. The inner ligature 21 can be seen in FIG. 3.

As will be evident, the two ligatures 20 and 21 relate to the same leg of the rider, and they are connected together by means of strap 22. The strap 22 rests upon the rider's thigh above the knee, as pictures, and it does not move with respect thereto. Ligatures 20 and 21, however, move with respect to the strap 22 as the thigh moves. This is facilitated by pulleys 23 and 24.

The end of the ligatures, such as the ligature 20, is connected to a fixed element 25 which is positioned beneath seat 12 and to the rear of the same. As seen in FIG. 1, the ligatures pull the strap 22 against the rider's thigh to maintain contact therebetween as the pedals are powered through their rotary cycle. The connecting element 25 is conveniently mounted on the rear forks 26, one of these forks being shown in FIGS. 1 and 2.

As has been indicated, it is desired to have the element 25 remain stationary while the bicycle is powered, but to be released for forward motion when the brake is applied to stop the vehicle. This is especially important in a bicycle where one must have freedom of the legs when the moving bicycle is being braked. More particularly, the ligature may be adjusted by turning horizontal rod 25, which may be accomplished by loosening screw 27. The ligatures, being secured to rod 25, maintain tension as the bicyle is operated. When rod 25 is released by the interplay of elements 30, 35 and 36 and allowed to move forward, the tension on ligatures 20 and 21 is released, freeing the rider's legs to reach the ground.

Figure 2:
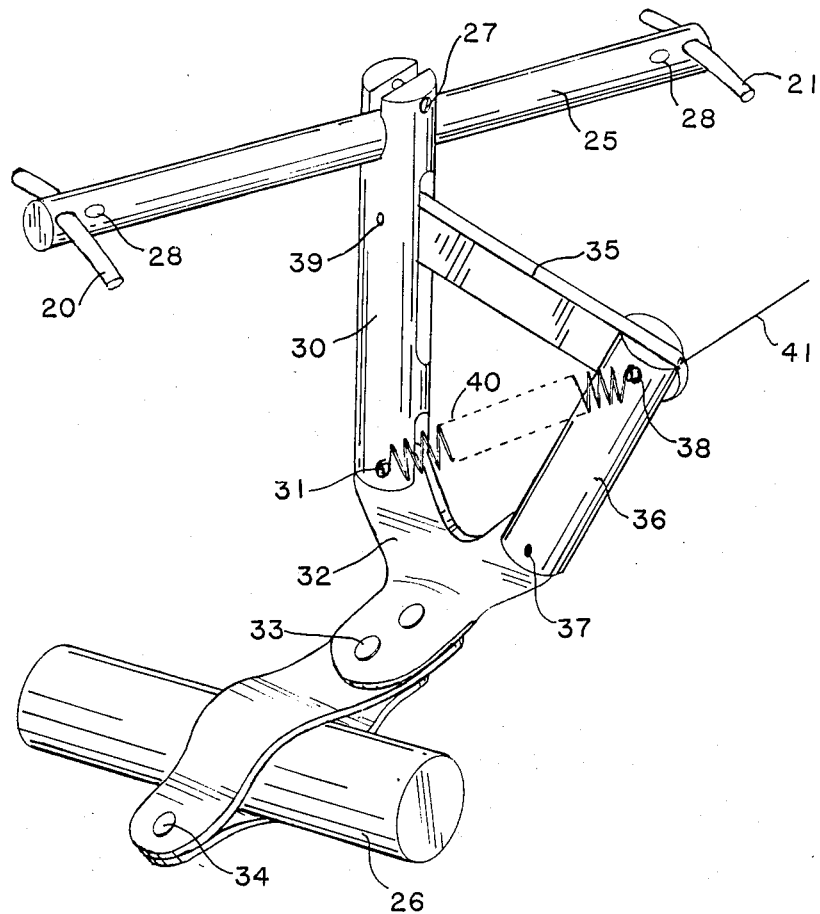
FIG. 2 is a partial pictorial view showing an enlarged view of the brake-actuated ligature release mechanism.

The release mechanism is shown in FIG. 1 and in greater detail in FIG. 2. From these drawings it will be seen that element 25 is simply a bar having holes 28 therein through which the rear end of the ligatures extend. The length of the ligature can be regulated by simply tying it on the far side of element 25, or if a more easily adjustable structure is desired, one can loosen screw 27 and rotate bar 25 until the proper length of ligatures 20 and 21 is achieved.

Element 25 extends laterally from a main support 30 which is pivotally mounted at 31 to a clamp 32 which is secured to the rear fork 26 by bolts 33 and 34. The main support 30 is prevented from moving forwardly by links 35 and 36. Link 36 is pivoted at 37 to clamp 32. In turn, link 35 is pivoted at one end to link 36 at 38 and at its other end to main support 30 at 39.

In its locked position, link 30 is prevented from forward motion by links 35 and 36. In the locked position, link 35 is hinged with link 30, and forms a toggle structure in cooperation with link 36 to prevent link 30 from moving forward relative to the rider. Spring 40 ensures that the linkage returns to the locked position when tension on wire 41 is released. Wire 41 is connected to the brake system, usually by tying it to the brake wire running to the rear wheel, as shown in FIG. 1. In this way, whenever the brake is applied, wire 41 is pulled forwardly to move pivot 38 forwardly which allows main support 30 to move forwardly to allow element 25 to move forwardly, thereby easing the tension on the ligatures.

Brake power is used only to unlock the system. The further forward motion of element 25 is accomplished by motion of the rider's leg; such sidewise or forward motion of the leg carrier strap 22 and attached ligatures 20 and 21 to pull element 25 forward into the fully unlocked position. Upon releasing the brake and placing the foot back on the pedal in riding position, spring 40 acts to bring the system back to its locked position.

Turning to FIG. 3, the inner and outer extensions 18 and 19 of the pedal axle 17 are easily seen as is the rotatable mounting of the ligatures 20 and 21 on these extensions. Also visible are the pulleys 23 and 24 on which the ligatures ride. These pulleys are connected to the ends of strap 22 by means of links 50 and 51.

While it is not shown in FIG. 3, one may employ flaps 52 as shown in FIG. 1 to prevent skin and hair from becoming caught in the pulleys as the ligatures move longitudinally therethrough.

It is preferred to make strap 22 in two sections 53 and 54 which are interconnected in releasable fashion at 55. Such releasable interconnection acts as a safety mechanism by allowing the rider to extricate himself from the device quickly. The release mechanism may be structured like the seat belts in aircraft, or in any desired fashion.

Figure 4:
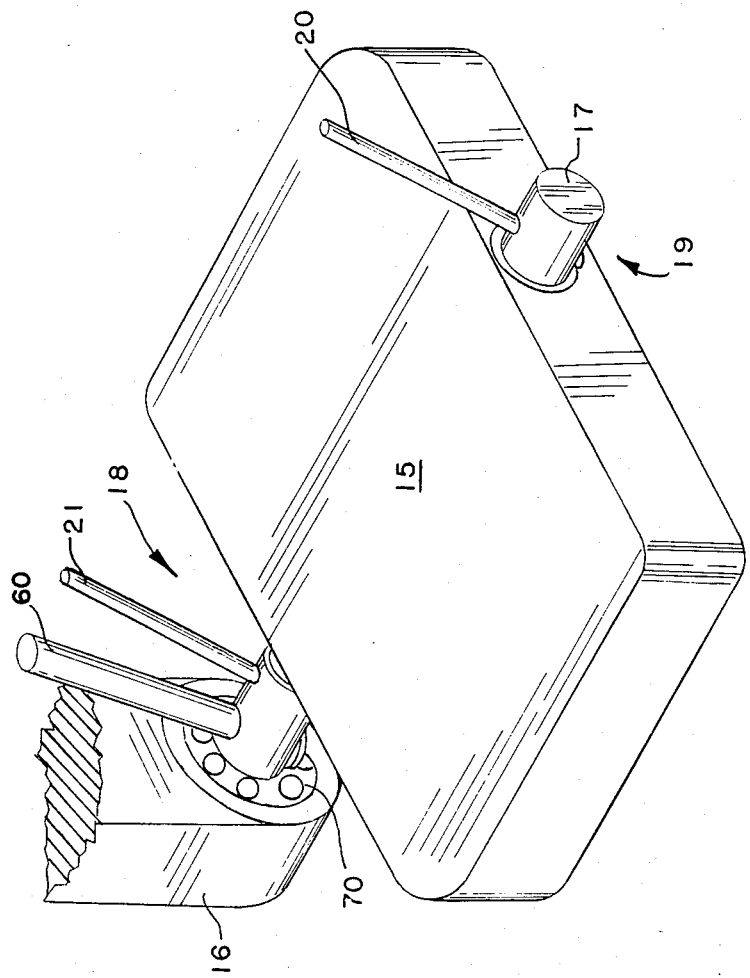
FIG. 4 is a pictorial view showing a modified pedal structure including a bearing incorporated into the crank assembly.

Turning to FIG. 4, a pedal crank assembly is shown. A bearing 70 is mounted near the terminal of crank 16. This pedal-crank-bearing structure allows the pedal to rotate while providing effective attachment points 18 and 19 for ligatures 20 and 21.

In one implementation in a stationary device, the structure can include a hand-operated element 60 which is connected at its lower end to the pedal axle 17. This hand element is preferred when the structure is used for exercise purposes rather than on a wheeled vehicle, like a bicycle.

From the standpoint of materials, the strap which rests above the knee can be made of leather, plastic or strong fabric, and the ligature can be made of nylon rope or metal wire.

The invention is defined in the claims which follow.
What is claimed is:

1. In a pedal powered structure, a frame carrying a seat and a main axle positioned forwardly of and below said seat, a pair of cranks connected to said axle, one on each side thereof, a pedal mounted by means of a pedal axle at the free end of each crank, said pedal being rotationally mounted on said pedal axle, said pedal axle extending beyond said pedal at its inner and outer ends to provide inner and outer pedal axle extensions, ligatures, one for each of said inner and outer pedal axle extensions, each of a pair of said ligatures being connected at one end to one of said pedal axle extensions, the other end of each of said ligatures being connected to an element mounted behind and below said seat, said ligatures mounted as set forth providing two pairs of parallel ligatures spaced apart by approximately the width of said pedal, and strap means secured between each pair of parallel ligatures intermediate its length to rest upon the thigh of the rider above the knee when the rider is using said pedal powered structure.

2. A pedal-powered structure as recited in claim 1 in which each ligature is connected to a strap end by means of a pulley, one pulley being present at each end of each strap, this arrangement allowing each strap to remain fixed on the thigh above the knee as the ligatures move longitudinally with respect to the strap as the rider powers the pedals.

3. A pedal-powered structure as recited in claim 2 in which a downwardly extending flap is carried at each end of each strap to help keep hair and skin from being caught in the pulley.

4. A pedal-powered structure as recited in claim 1 in which each strap is formed in two sections which are releasably interconnected with each other.

5. A pedal-powered structure as recited in claim 1 further including bearings carried within said cranks and in which said pedal axles are rotationally mounted in said bearings.

6. A pedal-powered structure as recited in claim 1 in which the ends of said ligatures remote from said pedal axles are secured to a fixed element which is releasable to allow said fixed element to move forwardly and thereby release the tension on said ligatures.

7. A pedal-powered structure as recited in claim 6 in which said fixed element is locked in a rearward position by means of links comprising a locking toggle structure, and means are provided to free said fixed element for forward movement of the element.

* * * * *